United States Patent Office 3,184,908
Patented May 25, 1965

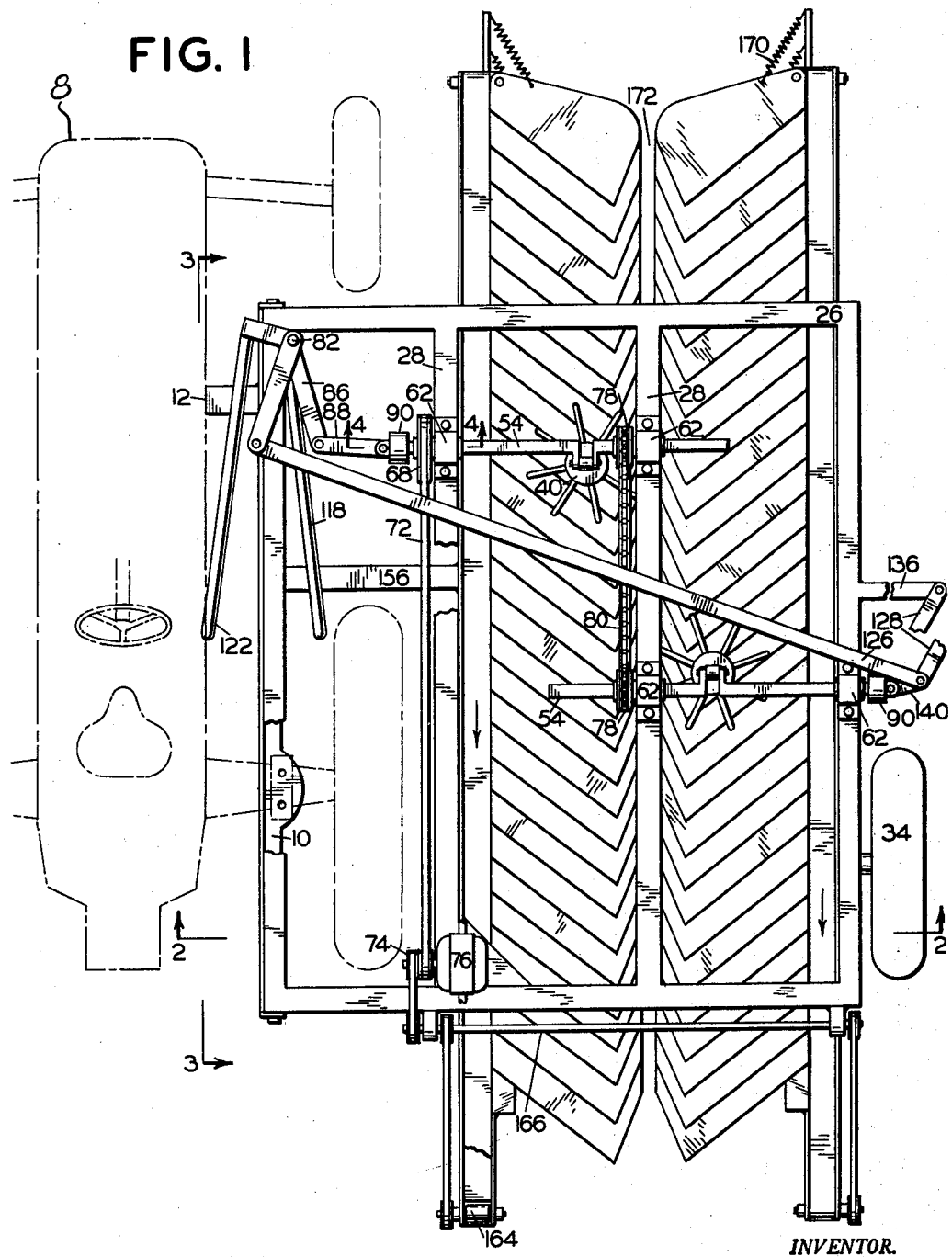

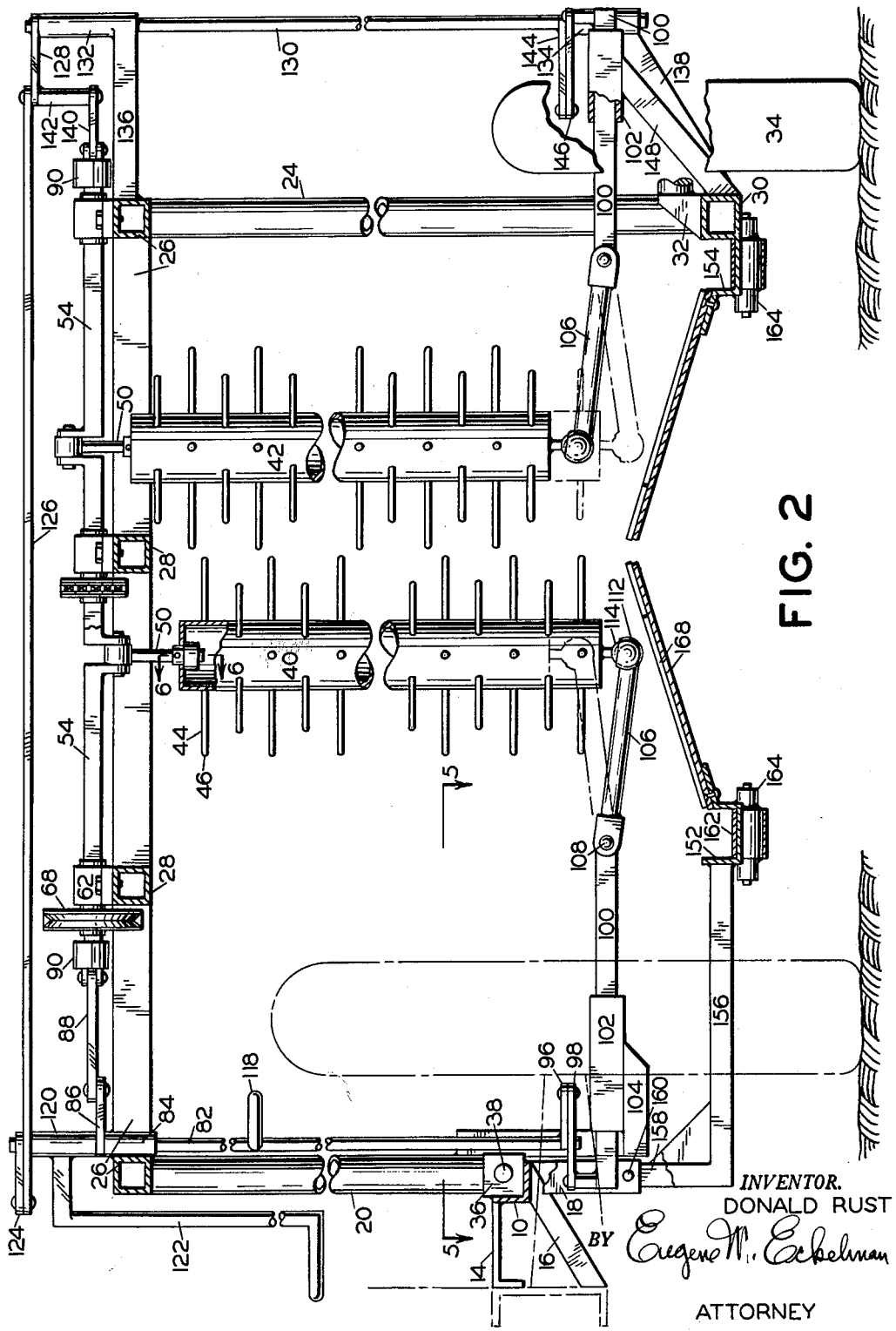

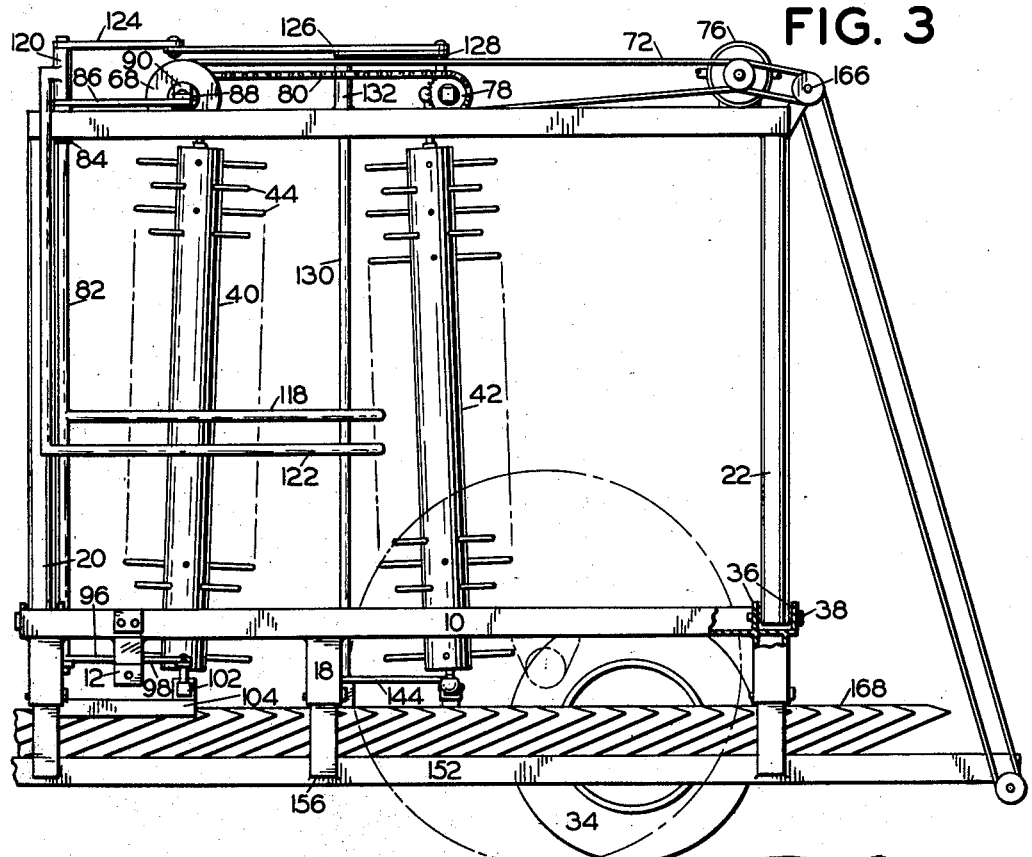
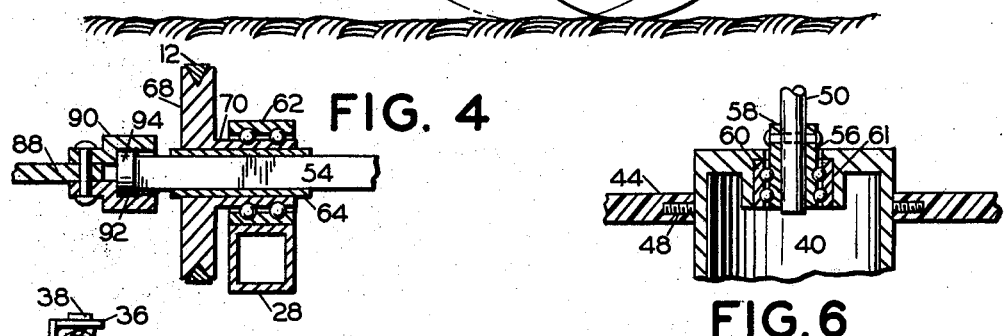
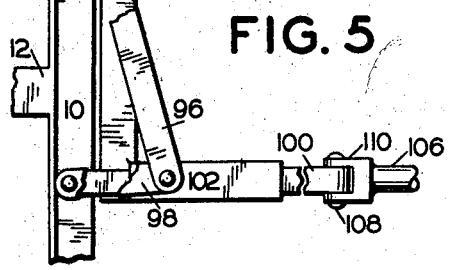
INVENTOR.
DONALD RUST
BY Eugene M. Eckelman
ATTORNEY

3,184,908
BERRY HARVESTING APPARATUS
Donald Rust, Rte. 2, Box 313, Troutdale, Oreg.
Filed Aug. 16, 1962, Ser. No. 217,393
7 Claims. (Cl. 56—330)

This invention relates to a new and useful apparatus for harvesting berries and is particularly applicable for the harvesting of cane berries such as raspberries.

A primary objective of the present invention is to provide an apparatus for harvesting cane berries employing a new and novel shaking action for removing the ripe berries.

Another objective of the present invention is to provide an apparatus for harvesting cane berries which operates efficiently to remove the ripe berries from the canes without damage to the latter.

Another object is to provide an apparatus of the type described having means whereby vine engagement means are laterally adjustable and whereby the apparatus is capable of straddling a row of cane berries and capable of threading past wire supporting posts in the row of berries.

Another object is to provide an apparatus of the type described employing a pair of vertically reciprocable and freely rotatable drums which have flexible fingers thereon for engaging the berry vines.

Still another object is to provide a berry harvesting apparatus of novel structure facilitating attachment to and operation by a conventional tractor.

Briefly stated, the present berry harvesting apparatus employs a framework which may be attached to a conventional tractor and which is supported at an outer point by wheel means. This framework carries a pair of vertically reciprocating driven members supporting a plurality of flexible vine engaging fingers which operate with the reciprocating members to shake the vines for removing the ripe berries. The pair of members are laterally adjustable to position them in optimum vine engaging relation as well as to allow the apparatus to be threaded around wire supporting posts when operating in a straddled position down a row of berry vines.

The invention will be better understood and additional objects will become apparent from the following specification and claims, considered together with the accompanying drawings, wherein the numerals of reference indicate like parts and wherein:

FIGURE 1 is a top plan view of the present apparatus and a tractor to which it is attached, the latter being shown in broken lines;

FIGURE 2 is an enlarged lateral sectional view of the apparatus taken on the line 2—2 of FIGURE 1;

FIGURE 3 is a fragmentary longitudinal sectional view taken on the line 3—3 of FIGURE 1;

FIGURE 4 is an enlarged fragmentary sectional view taken on the line 4—4 of FIGURE 1;

FIGURE 5 is an enlarged fragmentary sectional view taken on the line 5—5 of FIGURE 2; and FIGURE 6 is a fragmentary sectional view of an upper portion of one of the reciprocating members, taken on the line 6—6 of FIGURE 2.

Referring now in detail to the drawings and first to FIGURE 1, the present berry harvesting apparatus is adapted particularly for attachment to a conventional type farm tractor 8, although it is to be understood that it may be attached to any other suitable power means if desired. With reference now to FIGURES 1, 2, and 3, the apparatus employs a tractor mounting frame for attaching it to a tractor comprising a longitudinal frame member 10, such as an angle iron, carrying a forward mounting bracket 12, FIGURES 1 and 3 and a rear mounting bracket 14, FIGURE 2, the latter bracket including an angularly disposed lower reinforcing strut 16. Also forming an integral part of longitudinal frame member 10 are depending pipe sections 18 which form sockets for the reception of structure to be described hereinafter.

The tractor mounting frame thus far described is separable from other portions of the berry harvesting apparatus and is adapted therefore to be readily attached to the tractor without having to manipulate the entire apparatus. Attachment of the tractor mounting frame to a tractor is readily accomplished since the bracket 12 is adapted to be secured to conventional bracket securing means on the tractor and the bracket 14 is adapted to be secured to fender attaching means for the tractor.

The apparatus has a main frame comprising forward and rearward upright members 20 and 22, respectively, on the tractor side which are attachable to the longitudinal member 10 of the tractor mounting frame, a pair of upright frame members 24 on the other side of the apparatus, one of which is shown in FIGURE 2, a top rectangular frame 26 integrally secured to the upright frame members, a pair of longitudinally disposed intermediate frame members 28 forming a part of the top frame portion 26, and a bottom longitudinally disposed frame member 30 secured to the bottom ends of upright frame members 24.

Fixed to longitudinal frame member 30 is an axle assembly 32 for a wheel 34 which supports the far side of the apparatus.

Upright frame members 20 and 22 are pivotally and removably attached to the longitudinal frame member 10 of the tractor mounting frame and for this purpose, and as best seen in FIGURES 2 and 3, longitudinal frame member 10 has pairs of spaced upright ears 36 for receiving a pivot pin 38 on which the upright members are supported. By this pivotal connection it is apparent that the entire framework can pivot relative to the tractor mounting frame in order that the wheel 34 can traverse uneven ground without imparting a strain on the tractor or mounting frame.

Forming a part of the present apparatus are upright shaker elements 40 and 42 preferably of hollow or drum construction and each having a plurality of flexible fingers 44 projecting radially therefrom. An efficiently operating arrangement of fingers 44 comprises sets thereof mounted four in a set and spaced a few inches apart vertically. Alternate sets of fingers 44 are elongated and preferably the outer end 46 is rounded to prevent damage to berry vines.

As best seen in FIGURE 6 the mounting of the fingers on the shakers 40 is accomplished by means of threaded studs 48 welded or otherwise secured to the shakers, and the fingers 44 have end bores for threaded engagement with the studs.

Shakers 40 and 42 are suspended on rods 50 pivotally connected to transverse crank shafts 54. As best apparent in FIGURE 1, crank shafts 54 are longitudinally spaced and are also laterally offset whereby the shakers 40 and 42 are also longitudinally spaced and laterally offset.

FIGURE 6 illustrates the suspended connection between the rods 50 and the shakers. In each connection, a bearing 56 has an inner race 58 pin connected to the rods 50 and an outer race 60 confined in a bottom opening socket 61 in the upper wall of the shakers. Thus, by this bearing mounting the shakers are free to rotate on the rods.

Crank shafts 54 are journaled in bearings 62 mounted on the upper surface of frame members 26 and 28. These shafts may be rectangular in cross-section and with such construction there is associated with the bearings bushing members 64, FIGURE 4, which have a rectangularly shaped bore to receive the shafts and which have a circular outer periphery for operation in the bearing. For the purpose of rotatably driving the shafts 54, however, the forwardmost shaft has a pulley 68 which may be mounted on the shaft for rotation therewith through the provision of a hub 70 which grips the bushing 64 in a press fit or a keyed connection.

Pulley 68 receives a drive belt 72 driven from a pulley 74 keyed to the shaft of a drive motor 76. Motor 76 preferably is a fluid operated motor driven from a hydraulic pump on the tractor.

Keyed to the two shafts 54 are sprockets 78 connected by a chain 80. It is thus apparent that the forwardmost shaft 54 is driven by the motor 76 and the rear shaft 54, being chained to the forward shaft, operates at the same speed whereby the two shakers are synchronized in their movement, either having simultaneous up and down movement or in a preferred form having opposite up and down movement.

Shakers 40 and 42 are laterally shiftable and for this purpose the shafts 54 are slidably contained in their respective bearings, i.e. they are slidable in the inner race of the bearings or in the case of the bearing adjacent the drive pulley 68 the one shaft is slidable in the bushing 64. As best seen in FIGURE 1, the inner ends of the shafts project beyond their bearings. The shafts and the shakers are shifted laterally independently of each other and a shifting assembly for the forward shaker 40 comprises an upright shaft 82 journaled adjacent its upper end in a sleeve 84 integrally forming a part of top frame 26. Secured to the shaft 82 above sleeve 84 is an arm 86 pivotally connected to a link 88 in turn pivotally connected to a thrust bearing 90 connected to one end of the associated shaft 54. A rotatable connection is established between the thrust bearing 90 and the shaft 54, and for this purpose such a bearing has an enlarged inner socket 92, FIGURE 4, in which is rotatably confined an enlarged head 94 on the end of shaft 54.

Since the shakers are mounted in suspended relation it is also desired that a stabilizing and shifting assembly be provided for the bottom thereof. For this purpose, the lower end of shaft 82 has an integral arm 96 pivotally connected to a link 98 in turn pivotally connected to a slide bar 100 slidably supported in a sleeve 102. Sleeve 102 is mounted on a bracket 104 secured integrally to the upright frame member 20.

A connecting rod 106 extends from the outer end of bar 100 and is pivotally connected thereto by a horizontal pivot pin 108 engageable with the bar 100 and a yoke 110, FIGURE 5, on the bar 106. Thus, the rod 106 can pivot in a vertical direction and has a ball socket 112 on its outer end to receive a ball 114 forming an integral bottom extension of the shaker 40.

A turning handle 118 is integrally secured to the shaft 82 and upon turning this handle the forward shaft 54 and the slide bar 100 are shifted to shift the shaker 40.

The shifting assembly for the other shaker, i.e. the shaker 42, comprises a sleeve 120 rotatably mounted on the upper end of shaft 82 and having a handle 122 integrally secured thereto. Integrally secured to sleeve 120 is an arm 124 pivotally connected to an elongated link 126 in turn pivotally connected to one end of an arm 128 at the far side of the apparatus. The other end of arm 128 is integrally secured to a shaft 130 rotatably supported in vertical upper and lower sleeve members 132 and 134, respectively, the upper sleeve member being supported on a horizontal arm 136 secured to frame portion 26 and the lower sleeve 134 being supported on an angular arm 138 extending from the lower frame member 30.

Arm 128 is pivotally connected to a link 140 and spaced therefrom through the medium of an upright sleeve 142, and link 140 is pivotally connected to a thrust bearing 90 of the associated shaft 54. The lower end of shaft 130 has an integral arm 144 pivotally connected to a link 146. A lower shifting mechanism similar to the mechanism described in connection with the shaker 40 is employed, comprising a shift bar 100 slidably supported in a sleeve 102 and pivotally connected to a rod 106 having a universal ball connection with the lower end of the shaker 42. Sleeve 102 is mounted on an arm 148 secured to the lower frame member 30.

Each of shifting handles 118 and 122 is disposed on the same side of the mechanism and importantly, as best seen in FIGURE 1, extend to a position readily available to the tractor operator. Also as seen in FIGURE 1, rotation of handles 118 and 122 in a clockwise direction shifts the shakers toward the tractor and rotation thereof in a counterclockwise direction shifts the shakers away from the tractor.

Berry catching means are employed comprising a pair of laterally spaced longitudinally disposed channels 152 and 154. Channel 152 is supported on support arms 156, FIGURE 2, which have an upright extension 158 for reception in the socket portions 18. Extensions 158 are pinned in the sockets by removable pins 160 and the support arms 156 thus may be removed if desired.

Each of channels 152 and 154 has a travelling belt 162 therein which operates over end rollers 164 for transporting harvested berries to the rearward end of the apparatus. End rollers 164 are suitably driven through the medium of a common laterally disposed shaft 166, FIGURES 1 and 3, driven by the motor 76 and in turn driving the rollers 164 through a suitable arrangement of belts and pulleys.

Extending inwardly from each of the channels 152 and 154 is an isolated series of pivotal bearing catching plates 168. These plates are urged to a forward rest position by springs 170 and the two sets thereof are slightly spaced at the center to form a center slot 172. The plates are pivotal rearwardly sufficiently to enlarge the slot 172 and allow the apparatus to move through wire supporting posts in the rows of berry vines.

*Operation*

The drive motor 76 is placed in operation and this provides for the vertical reciprocation of the shakers 40 and 42 and movement of the conveyor belts 162 in the channels 152 and 154. Upon movement of the apparatus down the row the plates 168 pivot rearwardly to receive the wire supporting posts in the row and upon passing the posts these plates return immediately to their initial berry catching position.

In a normal berry harvesting operation the shakers 40 and 42 are shifted inwardly to a position wherein the fingers thread through the berry vines but when moving into the plane of a wire holding post the shakers are shifted outwardly by the operator to clear the post. By alternately moving the shakers outwardly and inwardly the apparatus can be moved continuously without stopping for the posts.

It will be apparent that as the shakers reciprocate up and down they will shake the vine to remove the berries. As the shakers move into the vines they readily roll past the vines since they are freely rotatable on their supports. Thus, very little or no damage is done to the vines during the shaking operation.

In addition to the vertical reciprocating movement of the shakers and the freely rotatable movement thereof it will be apparent that rotation of the crank arm also reciprocates the shakers in a longitudinal direction on their lower pivots. This adds to the berry removing capability of the apparatus. The crank arms on the shaft 54 may vary in length to vary the oscillatory stroke.

For the purpose of mounting the present apparatus on a tractor, the tractor mounting frame 10 is separated from the remainder of the structure by the removal of the pins 38 to free it from the wheeled frame portion and removal of pins 160 to free it from the near section of fruit catching mechanism comprising the arms 156, the channel 152, and associated plates 168. Thus, the frame 10 is easily handled and therefore readily installed on the tractor. The detached parts can thereafter be attached to the frame 10, and such parts can be again detached from the frame 10 when it is desired to dismount the apparatus so that the tractor may be used for other purposes.

As best apparent in FIGURE 1, the frame member 10 is spaced laterally from the left-hand fruit collecting channel 152 to provide an opening in the apparatus for receiving the rear wheel of the tractor. Thus, the apparatus is mounted in close side association with a tractor to form a compact unit.

It is to be understood that the form of my invention herein shown and described is to be taken as a preferred example of the same and that various changes in the shape, size and arrangement of parts may be resorted to without departing frmom the spirit of the invention or the scope of the subjoined claims.

Having thus described my invention, I claim:

1. A berry harvesting machine comprising a frame adapted for movement along the ground adjacent rows of berry vines, the frame having a longitudinal opening therethrough wherein it is arranged to straddle a row of berry vines, a first vertically disposed vine engaging member supported for free rotation on said frame on one side of said opening for engaging one side of the vines in the straddling movement of the frame with a row of vines, a second vertically disposed vine engaging member supported for free rotation on said frame on the other side of said opening for engaging the other side of the row of vines, a plurality of fingers projecting outwardly from said vine engaging members, and means on the frame for reciprocating said two vine engaging members, said fingers in the reciprocation of said vine engaging members being arranged to abut against and shake berry vines for removing berries therefrom.

2. The berry harvesting machine of claim 1 wherein the means for vertically reciprocating said vine engaging members comprises rotatable shafts and crank means on said shafts connected to said vine engaging members.

3. The berry harvesting machine of claim 1 wherein the means for vertically reciprocating said vine engaging members comprises a rotatable shaft for each of said vine engaging members, crank means on said shafts connected to one end of said vine engaging members, means for driving said shafts, and means mounting said shafts for lateral adjustable movement to vary the lateral spacing of said vine engaging members.

4. The berry harvesting machine of claim 1 wherein the means for vertically reciprocating said vine engaging members comprises a rotatable shaft for each of said vine engaging members, crank means on said shafts connected to one end of said vine engaging members, means for driving said shafts, and means mounting said shafts for lateral adjustable movement to vary the lateral spacing of said vine engaging members, one of said vine engaging members being disposed forwardly of the other to provide a longitudinally offset relation of said vine engaging members.

5. A berry harvesting machine comprising a frame adapted for movement along the ground adjacent rows of berry vines, the frame having a base portion and an elevated portion supported on the base portion by upright standards, the frame having a longitudinal opening therethrough wherein it is arranged to straddle a row of berry vines, a first vertically disposed vine engaging member supported on one side of said opening for engaging one side of the vines in the straddling movement of the frame with a row of vines, a second vertically disposed vine engaging member on the other side of said opening for engaging the other side of the row of vines, transversely disposed rotatable shaft means journaled in the elevated portion of said frame, means for driving said shaft means, crank portions in said shafts, and connecting means between said crank portions and said vine engaging members whereby to support the latter members in suspended relation for vertical reciprocation.

6. The berry harvesting machine of claim 5 including means on the frame mounting said shafts for lateral adjustable movement to vary the lateral spacing of said vine engaging members, and handle means connected with each of said shafts and extending to one side of said frame for adjusting said shafts laterally.

7. A berry harvesting machine comprising a frame adapted for movement along the ground adjacent rows of berry vines, the frame having a longitudinal opening therethrough wherein it is arranged to straddle a row of berry vines, a first vertically disposed vine engaging member supported on said frame on one side of said opening for engaging one side of the vines in the straddling movement of the frame with a row of vines, a second vertically disposed vine engaging member supported on said frame on the other side of said opening for engaging the other side of the row of vines, said vine engaging members being cylindrical in shape and having a plurality of flexible fingers projecting radially outwardly therefrom for engaging the berry vines, and means on the frame for vertically reciprocating said two vine engaging members for shaking berries from the vines.

References Cited by the Examiner

UNITED STATES PATENTS

| | | | |
|---|---|---|---|
| 424,803 | 4/90 | Lowell | 56—236 |
| 1,323,089 | 11/19 | Neil | 56—14 |
| 2,544,443 | 3/51 | Brateng | 56—330 |
| 2,586,834 | 2/52 | Kreisman | 56—328 |
| 2,702,976 | 3/55 | Diserens | 56—12 |
| 2,993,323 | 7/61 | Tubbs | 56—330 |
| 3,114,997 | 12/63 | Folsom | 56—44 |
| 3,126,692 | 3/64 | Weygandt et al. | 56—330 |

ANTONIO F. GUIDA, *Acting Primary Examiner.*

RUSSELL R. KINSEY, T. GRAHAM CRAVER,
*Examiners.*